US012768978B2

(12) United States Patent
Yang et al.

(10) Patent No.: US 12,768,978 B2
(45) Date of Patent: Oct. 20, 2026

(54) METHODS AND APPARATUSES FOR VELOCITY MEASUREMENT WITH RADAR SENSORS

(71) Applicant: HONEYWELL INTERNATIONAL INC., Charlotte, NC (US)

(72) Inventors: Fan Yang, Charlotte, NC (US); Honglei Jiang, Charlotte, NC (US); Yu Hu, Charlotte, NC (US); Yangyang Li, Charlotte, NC (US); Jun Ge, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 171 days.

(21) Appl. No.: 18/656,803

(22) Filed: May 7, 2024

(65) Prior Publication Data

US 2024/0402327 A1 Dec. 5, 2024

(30) Foreign Application Priority Data

Jun. 1, 2023 (CN) ......................... 202310646976.5

(51) Int. Cl.
*G01S 13/58* (2006.01)
*B66B 5/00* (2006.01)
*G01S 13/60* (2006.01)

(52) U.S. Cl.
CPC ............ *G01S 13/583* (2013.01); *G01S 13/60* (2013.01); *B66B 5/0018* (2013.01)

(58) Field of Classification Search
CPC ...... G01S 13/583; G01S 13/60; G01S 13/343; G01S 7/354; G01S 13/584; G01S 13/931; B66B 5/0018
See application file for complete search history.

(56) References Cited

U.S. PATENT DOCUMENTS 5,325,097 A 6/1994 Zhang et al.
6,434,506 B1 8/2002 Eckersten et al.
(Continued)

FOREIGN PATENT DOCUMENTS

CN 114735558 A 7/2022
EP 3147685 B1 1/2020
(Continued)

OTHER PUBLICATIONS

Extended European Search Report Mailed on Oct. 8, 2024 for EP Application No. 24172405, 11 page(s).
(Continued)

*Primary Examiner* — Bernarr E Gregory
*Assistant Examiner* — Kenneth W Good
(74) *Attorney, Agent, or Firm* — Alston & Bird LLP

(57) ABSTRACT

Systems and methods for measuring a relative velocity between a radar sensor and a radar reflector by a controller component are provided. The method includes but is not limited to: causing the radar sensor to transmit a first chirp signal and a second chirp signal toward the radar reflector, where a duration of the first chirp signal is different from a duration of the second chirp signal; causing the radar sensor to receive a first reflected chirp signal of the first chirp signal and a second reflected chirp signal of the second chirp signal; determining a first velocity based on the first chirp signal and the first reflected chirp signal; determining a second velocity based on the second chirp signal and the second reflected chirp signal; and determining the relative velocity between the radar sensor and the radar reflector by comparing the first velocity and the second velocity.

18 Claims, 8 Drawing Sheets

(56) References Cited

U.S. PATENT DOCUMENTS

| | | | | |
|---|---|---|---|---|
| 8,994,583 | B2 | 3/2015 | Bruce | |
| 10,775,481 | B1 * | 9/2020 | Puglielli | G01S 13/87 |
| 10,852,419 | B2 * | 12/2020 | Zhong | B60R 11/04 |
| 11,561,299 | B1 * | 1/2023 | Hong | G01S 13/72 |
| 2003/0115015 | A1 | 6/2003 | Kosowsky et al. | |
| 2007/0109176 | A1 | 5/2007 | Nakanishi et al. | |
| 2011/0037641 | A1 | 2/2011 | Steffens | |
| 2012/0092209 | A1 | 4/2012 | Nakagawa | |
| 2017/0082744 | A1 | 3/2017 | Matsumoto et al. | |
| 2017/0123059 | A1 * | 5/2017 | Asanuma | G01S 13/343 |
| 2019/0120955 | A1 | 4/2019 | Zhong et al. | |
| 2021/0003691 | A1 * | 1/2021 | Zaidi | G01S 7/35 |
| 2021/0296764 | A1 * | 9/2021 | Shams | G01S 13/931 |
| 2021/0389452 | A1 * | 12/2021 | Lau | G01S 13/347 |
| 2022/0026526 | A1 | 1/2022 | Maekawa et al. | |
| 2022/0171050 | A1 | 6/2022 | Liu et al. | |

FOREIGN PATENT DOCUMENTS

| | | | |
|---|---|---|---|
| JP | 06-347545 | A | 12/1994 |
| JP | 2000-103283 | A | 4/2000 |
| JP | 2003-222671 | A | 8/2003 |
| JP | 2012-083265 | A | 4/2012 |
| JP | 2017-058291 | A | 3/2017 |
| JP | 2022-021837 | A | 2/2022 |
| WO | 2016/116146 | A1 | 7/2016 |
| WO | 2017/050798 | A1 | 3/2017 |

OTHER PUBLICATIONS

English Translation of JP Notice of Allowance, including Search Report dated Apr. 16, 2025 for JP Application No. 2024077017, 3 page(s).

English Translation of JP Office Action dated Jan. 9, 2025 for JP Application No. 2024077017, 5 page(s).

JP Notice of Allowance, including Search Report Mailed on Apr. 16, 2025 for JP Application No. 2024077017, 3 page(s).

JP Office Action Mailed on Jan. 9, 2025 for JP Application No. 2024077017, 4 page(s).

English Translation of KR Office Action dated Apr. 2, 2026 for KR Application No. 10-2024-0063016, 7 page(s).

KR Office Action Mailed on Apr. 2, 2026 for KR Application No. 10-2024-0063016, 6 page(s).

* cited by examiner

METHODS AND APPARATUSES FOR VELOCITY MEASUREMENT WITH RADAR SENSORS

CROSS-REFERENCE TO RELATED APPLICATIONS

This application claims priority pursuant to 35 U.S.C. 119(a) to Chinese Application No. 202310646976.5, filed Jun. 1, 2023, which application is incorporated herein by reference in its entirety.

FIELD OF THE INVENTION

Exemplary embodiments of the present disclosure relate generally to methods for velocity measurement, and more particularly, to methods, apparatuses, and systems for velocity measurement with frequency modulated continuous wave (FMCW) radar sensor.

BACKGROUND

Applicant has identified many technical challenges and difficulties associated with velocity measurement with radar sensors using frequency modulated continuous wave (FMCW) signals. Through applied effort, ingenuity, and innovation, Applicant has solved problems relating to these ground speed sensors by developing solutions embodied in the present disclosure, which are described in detail below.

BRIEF SUMMARY

Various embodiments described herein relate to components, apparatuses, and systems for monitoring an internal organ temperature.

In accordance with various embodiments of the present disclosure, a method for measuring a relative velocity between a radar sensor and a radar reflector by a controller component is provided. The method includes, but not limited to: causing the radar sensor to transmit a first chirp signal and a second chirp signal toward the radar reflector, where a duration of the first chirp signal is not equal to a duration of the second chirp signal; causing the radar sensor to receive a first reflected chirp signal of the first chirp signal and a second reflected chirp signal of the second chirp signal; determining a first velocity based on the first chirp signal and the first reflected chirp signal of the first chirp signal; determining a second velocity based on the second chirp signal and the second reflected chirp signal of the second chirp signal; and determining the relative velocity between the radar sensor and the radar reflector by comparing the first velocity and the second velocity.

In some embodiments, determining the first velocity based on the first chirp signal and the first reflected chirp signal of the first chirp signal including, but not limited to: determining a first phase difference between the first chirp signal and the first reflected chirp signal of the first chirp signal; and determining the first velocity based on the first phase difference.

In some embodiments, the first velocity ($V_1$) is determined by a following equation:

$$V_1 = \frac{\lambda}{4\pi T_{c1}}\Delta\varphi_1 = k_1\Delta\varphi_1 \ \ \Delta\varphi_1 \in [-\pi, \pi],$$

wherein $\lambda$ is a wavelength of the first chirp signal, $T_{c1}$ is the duration of the first chirp signal, $\Delta\varphi_1$ is the first phase difference between the first chirp signal and the first reflected chirp signal of the first chirp signal, and $k_1$ is equal to $$\frac{\lambda}{4\pi T_{c1}}.$$

In some embodiments, determining the second velocity based on the second chirp signal and the second reflected chirp signal of the second chirp signal including, but not limited to: determining the second phase difference between the second chirp signal and the second reflected chirp signal of the second chirp signal; and determining the second velocity based on the second phase difference.

In some embodiments, the second velocity ($V_2$) is determined by a following equation:

$$V_2 = \frac{\lambda}{4\pi T_{c2}}\Delta\varphi_2 = k_2\Delta\varphi_2 \ \ \Delta\varphi_2 \in [-\pi, \pi],$$

wherein $\lambda$ is a wavelength of the second chirp signal, $T_{c2}$ is the duration of the second chirp signal, $\Delta\varphi_2$ is the second phase difference between the second chirp signal and the second reflected chirp signal of the second chirp signal, and $k_2$ is equal to $$\frac{\lambda}{4\pi T_{c2}}.$$

In some embodiments, in an instance that the first velocity is substantially equal to the second velocity, determining the relative velocity between the radar sensor and the radar reflector is equal to the first velocity.

In some embodiments, in an instance that the first velocity is not substantially equal to the second velocity, further including, but not limited to: determining a first recalculated velocity $$(V_1^{p1})$$

based on a following equation:

$$V_1^{p1} = k_1(\Delta\varphi_1 + 2p_1\pi),$$

and determining a second recalculated velocity $$(V_2^{p2})$$

based on a following equation:

$$V_2^{p2} = k_2(\Delta\varphi_2 + 2p_2\pi),$$

wherein $\Delta\varphi_1$ is the first phase difference between the first chirp signal and the first reflected chirp signal of the first chirp signal, $\Delta\varphi_2$ is the second phase difference between the second chirp signal and the second reflected chirp signal of the second chirp signal, $k_1$ is equal to $$\frac{\lambda}{4\pi T_{c1}},$$

$k_2$ is equal to $$\frac{\lambda}{4\pi T_{c2}},$$

and $p_1$ and $p_2$ are integer.

In some embodiments, in an instance that the first recalculated velocity is substantially equal to the second recalculated velocity, the relative velocity between the radar sensor and the radar reflector is equal to the first recalculated velocity.

In some embodiments, the radar sensor is attached to an object and the radar reflector is stationary, and a velocity of the object is equal to the relative velocity between the radar sensor and the radar reflector.

In some embodiments, the radar reflector is attached to an object and the radar sensor is stationary, and a velocity of the object is equal to the relative velocity between the radar sensor and the radar reflector.

In some embodiments, the radar sensor includes, but not limited to: at least one transmitter configured to transmit the first chirp signal and the second chirp signal; and at least one receiver configured to receive the first reflected chirp signal of the first chirp signal and the second reflected chirp signal of the second chirp signal.

According to another embodiment, an apparatus for measuring a relative velocity between a radar sensor and a radar reflector is provided. The apparatus includes, but not limited to: the radar sensor; the radar reflector; and a controller component, where the controller component is configured to: cause the radar sensor to transmit a first chirp signal and a second chirp signal toward the radar reflector, wherein a duration of the first chirp signal is not equal to a duration of the second chirp signal; cause the radar sensor to receive a first reflected chirp signal of the first chirp signal and a second reflected chirp signal of the second chirp signal; determine a first velocity based on the first chirp signal and the first reflected chirp signal of the first chirp signal; determine a second velocity based on the second chirp signal and the second reflected chirp signal of the first chirp signal; and determine the relative velocity between the radar sensor and the radar reflector by comparing the first velocity and the second velocity.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
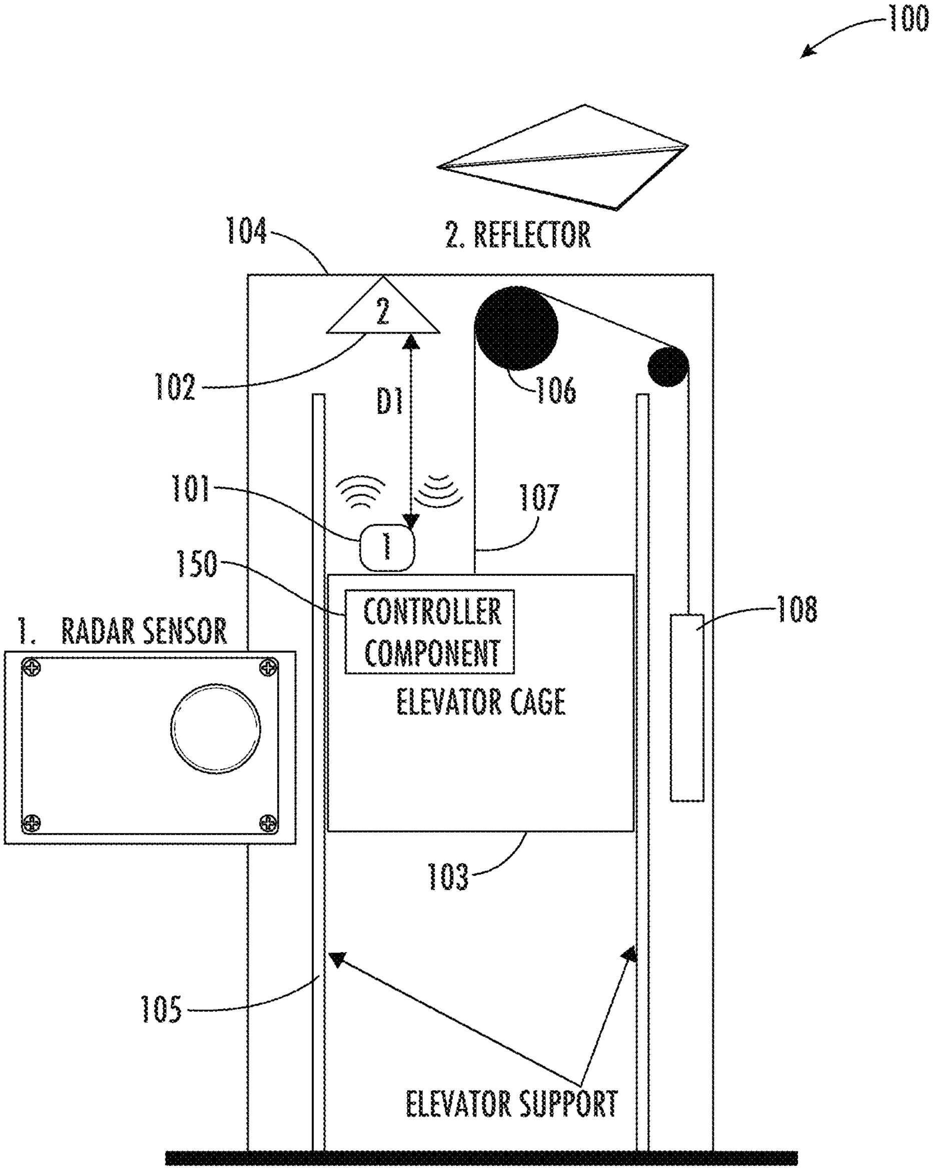
FIG. 1 illustrates an exemplary diagram depicting an apparatus for measuring a relative velocity between a radar sensor and a radar reflector, in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as "comprises", "includes", and "having" should be understood to provide support for narrower terms such as "consisting of", "consisting essentially of", and "comprised substantially of".

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various example embodiments address exemplary technical problems associated with determining an accurate velocity of an object in motion (e.g., a relative velocity between a radar sensor and a radar reflector). As understood by those of skill in the field to which the present disclosure pertains, for example, the relative velocity between two points, such as the radar sensor and the radar reflector, may be determined by emitting a radar signal (e.g., a chirp signal, a ping, or the like), receiving the feedback signal reflected from a radar reflector, and determining the relative velocity between the radar sensor and the radar reflector based on a change in phase between the radar signal and the feedback signal due to the Doppler effect. For example, the relative velocity between a radar sensor and a radar reflector may be proportional to the change in phase due to the Doppler effect. Thus, the accuracy of the determined relative velocity depends on the measurement of the change in phase between the radar signal and the feedback signal. However, the measurement of the change in the phase is unambiguous in instances in which the phase change is within a range from $-\pi$ to $\pi$ leaving certain peak velocities outside of the range. Therefore, there is a limitation on the maximum velocity measured by existing technologies.

Additionally or alternatively, in some examples, the maximum velocity that may be measured by existing technologies is inversely proportional to the duration of the chirp signal while the velocity resolution is proportional to the duration of the chirp signal. As such, there's a paradox in determining the duration of the chirp signal to improve the maximum velocity and velocity resolution simultaneously.

To address at least these exemplary problems as well as others, example systems and methods described herein transmit and receive at least two chirp signal with different durations. A first velocity may be determined based on the first chirp signal and the first reflected chirp signal of the first chirp signal, and a second velocity may be determined based on the second chirp signal and the second reflected chirp signal of the second chirp signal. The velocity of the object may be determined based on the first velocity and the second velocity. In some examples, various embodiments described in the present disclosure herein are directed to overcome the ambiguity of the velocity measurement based on the phase difference measurement. In some examples, various embodiments described in the present disclosure herein are directed to solving these technical challenges related to removing the limitation on the maximum velocity and improving the velocity resolution.

As a result of the herein described embodiments and in some examples, the maximum velocity and the velocity resolution by a radar sensor may be improved simultaneously, and the accuracy of the velocity measurement may be improved, in some examples, without the increase cost and power required by previous existing technologies.

Referring now to FIG. 1, an example diagram illustrating an apparatus 100 for measuring a relative velocity $V_r$ between a radar sensor and a radar reflector in accordance with some example embodiments described herein is provided. As shown in FIG. 1, the example apparatus 100 may comprise a radar sensor 101, a radar reflector 102, and a controller component 150. For example, the apparatus 100 may be configured to determine, by the controller component 150, a relative velocity $V_r$ between a radar sensor 101 and a radar reflector 102.

In some embodiments, the controller component 150 may be electrically coupled to and/or in electronic communication with the radar sensor 101.

In some embodiments, the radar sensor 101 may be configured to transmit at least two chirp signals toward the radar reflector 102. In some embodiments, the radar reflector 102 may reflect the at least two chirp signals back to the radar sensor 101. In some embodiments, the radar sensor 101 may be further configured to receive the reflected chirp signals of the at least two chirp signals. In some examples, each of the at least two chirp signals may be a signal of which the frequency increases/decreases with time. In some examples, each of the at least two chirp signals may be a signal of which the amplitude increases/decreases with time.

In some embodiments, for example, the at least two chirp signals may be frequency modulated continuous wave (FMCW) signals. For example, each of the at least two chirp signals may have a frequency increasing/decreasing linearly with time.

In some embodiments, for example, the radar sensor 101 is attached to and moving with an object 103 and the radar reflector 102 is stationary, and a velocity of the object 103 is equal to the relative velocity between the radar sensor and the radar reflector.

In some embodiments, for example, the radar reflector 102 is attached to and moving with the object 103 and the radar sensor 101 is stationary, and a velocity of the object 103 is equal to the relative velocity between the radar sensor and the radar reflector.

In some embodiments, for example, as shown in FIG. 1, the example apparatus 100 may be implemented in an elevator system to measure a velocity of an elevator cage (e.g., the object 103). In some examples, the elevator system may comprise the example apparatus 100, an elevator shaft 104, an elevator support 105 located in the elevator shaft 104, the elevator cage (the object 103) attached to the elevator support 105.

In some embodiments, the elevator system may further comprise a motor driver 108, a drive shaft 106, and a cable 107. For example, the motor driver 108 may be configured to provide a driving force through the cable 107 and the drive shaft 106 to move the elevator cage 103 along the elevator shaft 104.

Figure 2:
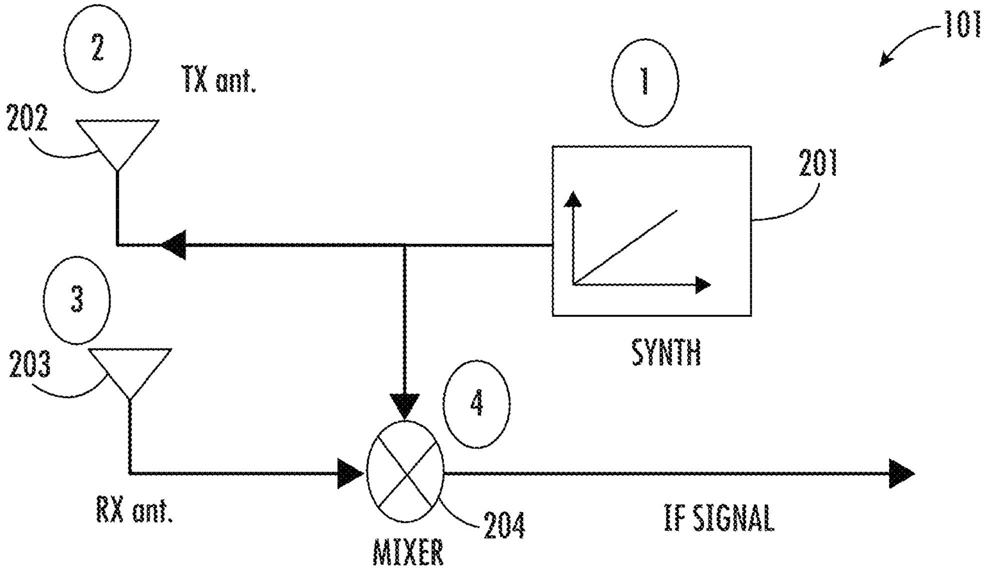
FIG. 2 illustrates an exemplary block diagram depicting an exemplary radar sensor, in accordance with various embodiments of the present disclosure.

Referring now to FIG. 2, a schematic block diagram depicting an exemplary radar sensor in accordance with various embodiments of the present disclosure is provided.

In some embodiments, as shown in FIG. 2, for example, a radar sensor 101 may comprise a synthesizer 201, at least one radar transmitter 202, at least one radar receiver 203, and a frequency mixer 204. In some embodiments, the synthesizer 201 may be configured to generate the at least two chirp signals.

In some embodiments, the at least one radar transmitter 202 may be configured to transmit the at least two chirp signals toward the radar reflector 102. In some embodiments, the at least one radar receiver 203 may be configured to receive the reflected chirp signals of the at least two chirp signals.

In some embodiments, the frequency mixer 204 may be configured to combine the reflected signals of the at least two chirp signals and the at least two chirp signals. In some examples, a phase difference between the reflected signals of the at least two chirp signals and the at least two chirp signals may be calculated/determined based on the reflected signals of the at least two chirp signals and the at least two chirp signals.

Figure 3:
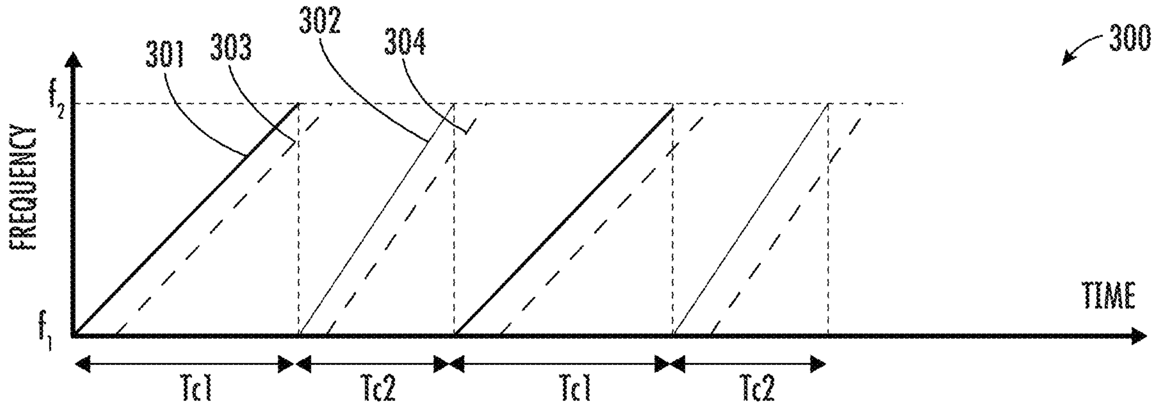
FIG. 3 illustrates an exemplary diagram illustrating chirp signals and reflected chirp signals, in accordance with various embodiments of the present disclosure.

Referring now to FIG. 3, a schematic diagram depicting exemplary signals and reflected signals in accordance with various embodiments of the present disclosure is provided.

In some embodiments, as shown in FIG. 3, for example, exemplary signals transmitted by the radar sensor 101 may comprise a first chirp signal 301 and a second chirp signal 302.

In some embodiments, for example, the first chirp signal 301 may change a frequency of the first chirp signal 301 linearly with time from a first frequency $f_1$ to a second frequency $f_2$ in a first duration $T_{c1}$. In some embodiments, for example, the second chirp signal 302 may change a frequency of the second chirp signal 302 linearly with time from the first frequency $f_1$ to the second frequency $f_2$ in a first duration $T_{c2}$.

In some embodiments, as shown in FIG. 3, for example, exemplary reflected signals received by the radar sensor 101 may comprise a first reflected chirp signal 303 of the first chirp signal 301 and a second reflected chirp signal 304 of the second chirp signal 302.

In some embodiments, a first velocity $V_1$ may be determined based on the first chirp signal 301 and the first reflected signal 303 of the first chirp signal 301. In some embodiments, a second velocity $V_2$ may be determined based on the second chirp signal 302 and the second reflected chirp signal 304 of the second chirp signal 302.

In some embodiments, determining the first velocity $V_1$ based on the first chirp signal 301 and the first reflected chirp signal 303 of the first chirp signal 301 may comprise determining a first phase difference $\Delta\varphi_1$ between the first chirp signal 301 and the first reflected chirp signal 303 of the first chirp signal 301, and determining the first velocity $V_1$ based on the first phase difference $\Delta\varphi_1$. In some examples, the first phase difference $\Delta\varphi_1$ may depend on a time delay between the first chirp signal 301 and the first reflected chirp signal 303 of the first chirp signal 301.

In some embodiments, determining the second velocity $V_2$ based on the second chirp signal 302 and the second reflected chirp signal 304 of the second chirp signal 302 may comprise determining a second phase difference $\Delta\varphi_2$ between the second chirp signal 302 and the second reflected chirp signal 304 of the second chirp signal 302, and determining the second velocity $V_2$ based on the second phase difference $\Delta\varphi_2$. In some examples, the second phase difference $\Delta\varphi_2$ may depend on a time delay between the second chirp signal 302 and the second reflected chirp signal 304 of the second chirp signal 302.

In some embodiments, the first velocity ($V_1$) may be determined by the following equation (Eq. 1):

$$V_1 = \frac{\lambda}{4\pi T_{c1}}\Delta\varphi_1 = k_1\Delta\varphi_1 \quad \Delta\varphi_1 \in [-\pi, \pi] \qquad \text{Eq. 1}$$

where λ is a wavelength of the first chirp signal 301, $T_{c1}$ is the duration of the first chirp signal 301, $\Delta\varphi_1$ is the first phase difference between the first chirp signal 301 and the first reflected chirp signal 303 of the first chirp signal 301, and $k_1$ is equal to $$\frac{\lambda}{4\pi T_{c1}}.$$

In some embodiments, the second velocity $V_2$ may be determined by the following equation (Eq. 2):

$$V_2 = \frac{\lambda}{4\pi T_{c2}}\Delta\varphi_2 = k_2\Delta\varphi_2 \quad \Delta\varphi_2 \in [-\pi, \pi] \qquad \text{Eq. 2}$$

where Δ is a wavelength of the second chirp signal 302, $T_{c2}$ is the duration of the second chirp signal 302, $\Delta\varphi_2$ is the second phase difference between the second chirp signal 302 and the second reflected chirp signal 304 of the second chirp signal 302, and $k_2$ is equal to $$\frac{\lambda}{4\pi T_{c2}}.$$

Referring back to FIG. 1, in some embodiments, the relative velocity $V_r$ between the radar sensor 101 and the radar reflector 102 may be determined based on the first velocity $V_1$ and the second velocity $V_2$.

In some embodiments, the relative velocity $V_r$ between the radar sensor 101 and the radar reflector 102 may be equal to the first velocity $V_1$ or the second velocity $V_2$ if the first velocity $V_1$ is substantially equal to the second velocity $V_2$.

In some examples, the first velocity $V_1$ is considered to be substantially equal to the second velocity $V_2$ when an absolute value of a difference between the first velocity $V_1$ and the second velocity $V_2$ is smaller than a preset threshold ΔV. For example, the preset threshold ΔV may generally be 5% of the first velocity $V_1$, preferably be 1% of the first velocity $V_1$, and more preferably 0.1% of the first velocity $V_1$. For example, the preset threshold ΔV may generally be 5% of the first velocity $V_2$, preferably be 1% of the first velocity $V_2$, and more preferably 0.1% of the first velocity $V_2$.

In some examples, the first velocity $V_1$ is considered to be not substantially equal to the second velocity $V_2$ when the absolute value of the difference between the first velocity $V_1$ and the second velocity $V_2$ is greater than or equal to the preset threshold ΔV.

In some embodiments, in an instance that the first velocity $V_1$ is not substantially equal to the second velocity $V_2$, a first recalculated velocity $$(V_1^{p1})$$

and a second recalculated velocity $$(V_2^{p2})$$

may be determined.

In some examples, the first recalculated velocity $$\left(V_1^{p1}\right)$$

may be determined based on the following equation (Eq. 3):

$$V_1^{p1} = k_1(\Delta\varphi_1 + 2p_1\pi) \quad \text{Eq. 3}$$

where $p_1$ is an integer number, $\Delta\varphi_1$ is the first phase difference between the first chirp signal 301 and the first reflected chirp signal 303 of the first chirp signal 301, and $k_1$ is equal to $$\frac{\lambda}{4\pi T_{c1}}.$$

In some examples, the second recalculated velocity $$\left(V_2^{p2}\right)$$

may be determined based on the following equation (Eq. 4):

$$V_2^{p2} = k_2(\Delta\varphi_2 + 2p_2\pi) \quad \text{Eq. 4}$$

where $p_2$ is an integer number, $\Delta\varphi_2$ is the second phase difference between the second chirp signal 302 and the second reflected chirp signal 304 of the second chirp signal 302, and $k_2$ is equal to $$\frac{\lambda}{4\pi T_{c2}}.$$

Figure 4A:
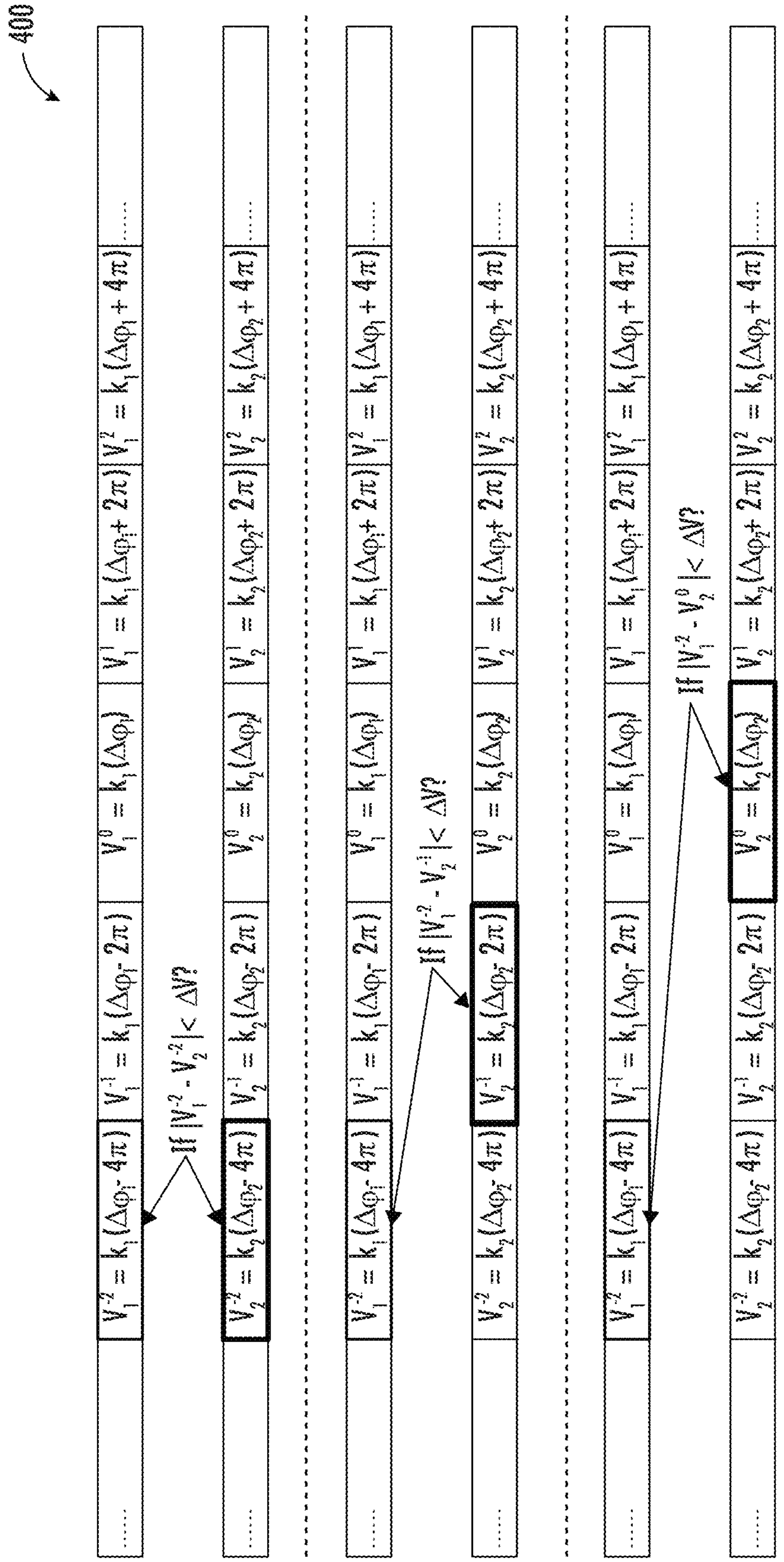
FIG. 4A illustrates an exemplary diagram depicting an exemplary table of equations for determining the first recalculated velocity and the second recalculated velocity, in accordance with various embodiments of the present disclosure.

Referring now to FIG. 4A, a schematic diagram depicting an exemplary table of equations for determining the first recalculated velocity and the second recalculated velocity in accordance with various embodiments of the present disclosure is provided.

As shown in FIG. 4A, for example purpose, equations to determine the first recalculated velocity $$\left(V_1^{p1}, \text{e.g., } V_1^{-2}, V_1^{-1}, V_1^{0}, V_1^{1}, \text{and } V_1^{2}\right)$$

are illustrated in odd rows. Similarly, equations to determine the second recalculated velocity $$\left(V_2^{p2}, \text{e.g., } V_2^{-2}, V_2^{-1}, V_2^{0}, V_2^{1}, \text{and } V_2^{2}\right)$$

is illustrated in even rows. In some examples, $p_1$ may be an integer number. In some examples, $p_2$ may be an integer number.

In some embodiments, the first recalculated velocity $$\left(V_1^{p1}, \text{e.g., } V_1^{-2}, V_1^{-1}, V_1^{0}, V_1^{1}, \text{and } V_1^{2}\right)$$

is compared to the second recalculated velocity $$\left(V_2^{p1}, \text{e.g., } V_2^{-2}, V_2^{-1}, V_2^{0}, V_2^{1}, \text{and } V_2^{2}\right)$$

to determine the relative velocity $V_r$ between the radar sensor 101 and the radar reflector 102.

In some embodiments, the relative velocity $V_r$ between the radar sensor 101 and the radar reflector 102 may be equal to the first recalculated velocity $$\left(V_1^{p1}, \text{e.g., } V_1^{-2}, V_1^{-1}, V_1^{0}, V_1^{1}, \text{and } V_1^{2}\right)$$

or the second recalculated velocity $$\left(V_2^{p2}, \text{e.g., } V_2^{-2}, V_2^{-1}, V_2^{0}, V_2^{1}, \text{and } V_2^{2}\right)$$

if the first recalculated velocity $$\left(V_1^{p1}, \text{e.g., } V_1^{-2}, V_1^{-1}, V_1^{0}, V_1^{1}, \text{and } V_1^{2}\right)$$

is substantially equal to the second recalculated velocity $$\left(V_2^{p2}, \text{e.g., } V_2^{-2}, V_2^{-1}, V_2^{0}, V_2^{1}, \text{and } V_2^{2}\right).$$

In some examples, the first recalculated velocity $$\left(V_1^{p1}, \text{e.g., } V_1^{-2}, V_1^{-1}, V_1^{0}, V_1^{1}, \text{and } V_1^{2}\right)$$

is considered to be substantially equal to the second recalculated velocity $$\left(V_2^{p2}, \text{e.g., } V_2^{-2}, V_2^{-1}, V_2^{0}, V_2^{1}, \text{and } V_2^{2}\right)$$

when an absolute value of a difference between the first recalculated velocity $$\left(V_1^{p1}, \text{e.g., } V_1^{-2}, V_1^{-1}, V_1^{0}, V_1^{1}, \text{and } V_1^{2}\right)$$

and the second recalculated velocity $$\left(V_2^{p2}, \text{e.g., } V_2^{-2}, V_2^{-1}, V_2^{0}, V_2^{1}, \text{and } V_2^{2}\right)$$

is smaller than a preset threshold ΔVr. For example, the preset threshold ΔVr may generally be 5% of the first recalculated velocity $$\left(V_1^{p1}, \text{e.g., } V_1^{-2}, V_1^{-1}, V_1^{0}, V_1^{1}, \text{ and } V_1^{2}\right),$$

preferably be 1% of the first recalculated velocity $$\left(V_1^{p1}, \text{e.g., } V_1^{-2}, V_1^{-1}, V_1^{0}, V_1^{1}, \text{ and } V_1^{2}\right),$$

and more preferably 0.1% of the first recalculated velocity $$\left(V_1^{p1}, \text{e.g., } V_1^{-2}, V_1^{-1}, V_1^{0}, V_1^{1}, \text{ and } V_1^{2}\right).$$

For example, the preset threshold ΔVr may generally be 5% of the second recalculated velocity $$\left(V_2^{p2}, \text{e.g., } V_2^{-2}, V_2^{-1}, V_2^{0}, V_2^{1}, \text{ and } V_2^{2}\right),$$

preferably be 1% of the second recalculated velocity $$\left(V_2^{p2}, \text{e.g., } V_2^{-2}, V_2^{-1}, V_2^{0}, V_2^{1}, \text{ and } V_2^{2}\right),$$

and more preferably 0.1% of the second recalculated velocity $$\left(V_2^{p2}, \text{e.g., } V_2^{-2}, V_2^{-1}, V_2^{0}, V_2^{1}, \text{ and } V_2^{2}\right).$$

In some examples, the first recalculated velocity $$\left(V_1^{p1}, \text{e.g., } V_1^{-2}, V_1^{-1}, V_1^{0}, V_1^{1}, \text{ and } V_1^{2}\right)$$

is considered to be not substantially equal to the second recalculated velocity $$\left(V_2^{p2}, \text{e.g., } V_2^{-2}, V_2^{-1}, V_2^{0}, V_2^{1}, \text{ and } V_2^{2}\right)$$

when the absolute value of the difference between the first recalculated velocity $$\left(V_1^{p1}, \text{e.g., } V_1^{-2}, V_1^{-1}, V_1^{0}, V_1^{1}, \text{ and } V_1^{2}\right)$$

and the second recalculated velocity $$\left(V_2^{p2}, \text{e.g., } V_2^{-2}, V_2^{-1}, V_2^{0}, V_2^{1}, \text{ and } V_2^{2}\right)$$

is greater than or equal to the preset threshold ΔVr.

In some embodiments, the first recalculated velocity $$\left(V_1^{p1}\right)$$

may be determined as $p_1$ iterates all the integer number. In some embodiments, the second recalculated velocity $$\left(V_2^{p2}\right)$$

may be determined as $p_2$ iterates all the integer number.

Figure 4B:
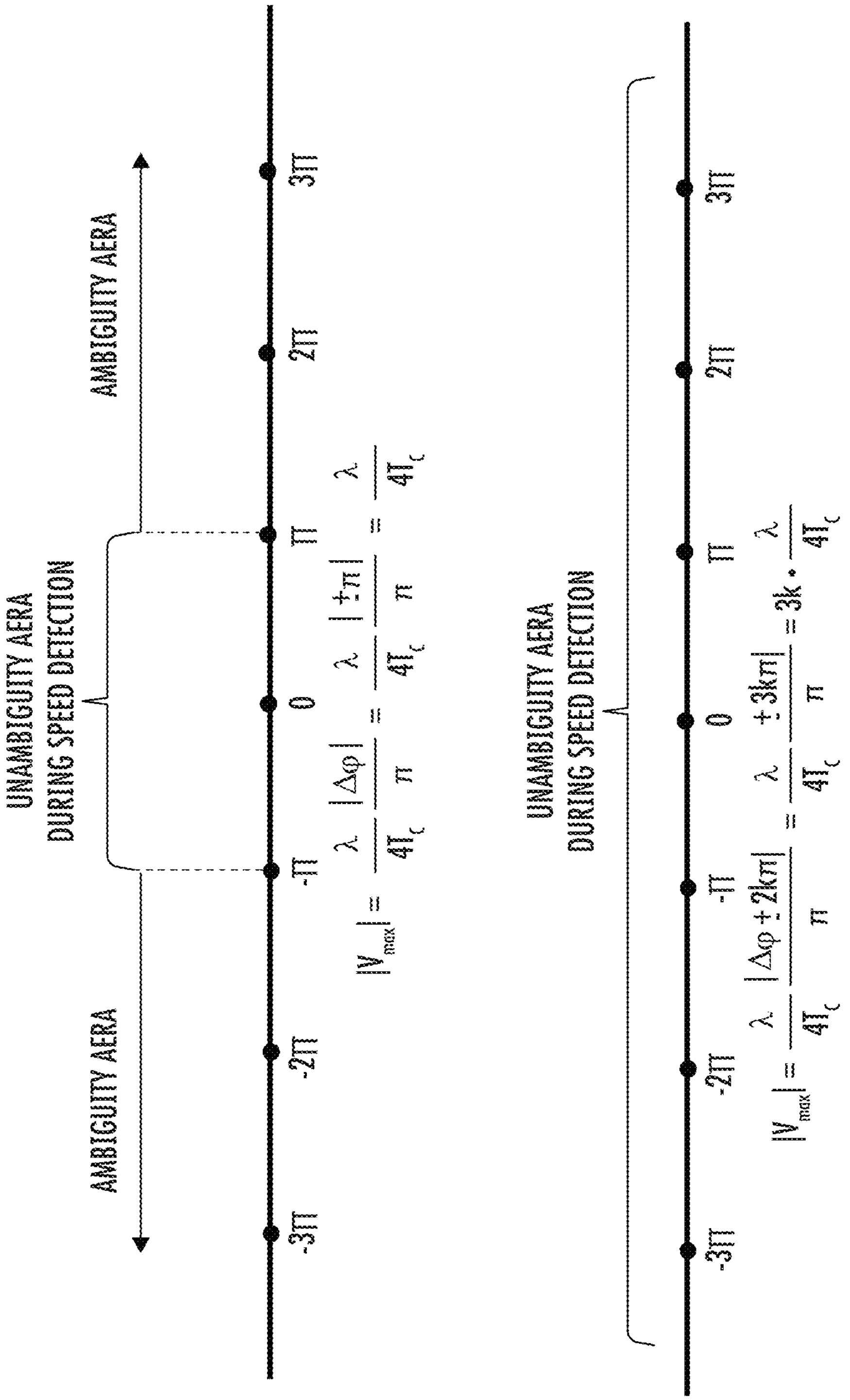
FIG. 4B illustrates an exemplary diagram depicting unambiguous areas for determining the relative velocity between the radar sensor and radar reflector, in accordance with various embodiments of the present disclosure.

Referring now to FIG. 4B, a schematic diagram depicting unambiguous areas for determining the relative velocity between the radar sensor and radar reflector in accordance with various embodiments of the present disclosure is provided.

For example, as shown in a top portion of FIG. 4B, an unambiguous area during the velocity measurement by using technologies with two chirp pulses with same duration $T_c$ is within a phase difference range from −π to π. In various embodiments, as shown in a bottom portion of FIG. 4B, an unambiguous area during the velocity measurement is expanded by using technologies with two chirp pulses with different durations. For example, a maximum velocity that can be measured may be determined by the following equation (Eq. 5):

$$|V_{max}| = \frac{\lambda}{4T_c}\frac{|\Delta\varphi \pm 2k\pi|}{\pi} = \frac{\lambda}{4T_c}\frac{|\pm 3k\pi|}{\pi} = 3k \cdot \frac{\lambda}{4T_c} \qquad \text{Eq. 5}$$

where $$\frac{\lambda}{4\pi T_c}$$

is a maximum velocity that can be measured by technologies with two single chirp pulses with same duration $T_c$, and k is a natural number. As a result of the present embodiments and in some examples, the maximum velocity that can be measured by a radar sensor may be improved.

Figure 5:
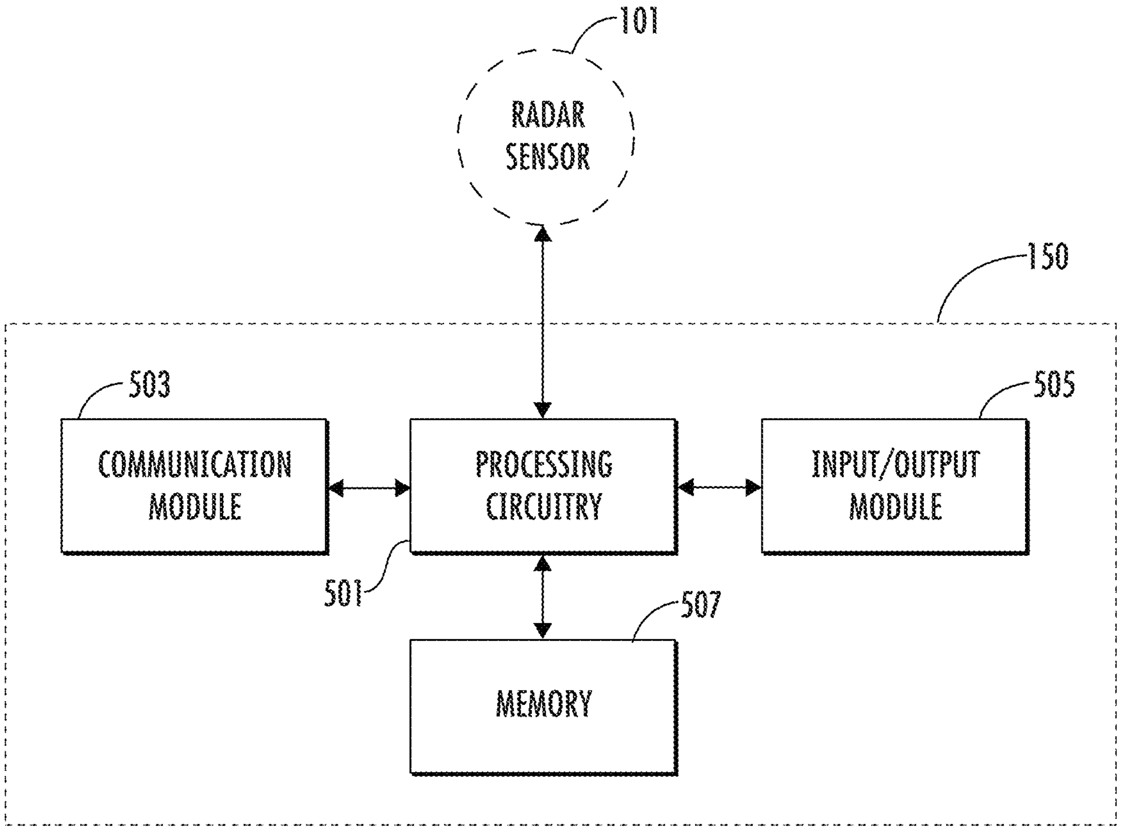
FIG. 5 illustrates an exemplary block diagram depicting an exemplary controller component, in accordance with various embodiments of the present disclosure.

Referring now to FIG. 5, a schematic diagram depicting a controller component 150 in accordance with various embodiments of the present disclosure. As shown, The controller component 150 may comprise a processing circuitry 501, a communication module 503, input/output module 505, a memory 507, and/or other components configured to perform various operations, procedures, functions or the like described herein.

As shown in FIG. 5, the controller component 150 (such as the processing circuitry 501, communication module 503, input/output module 505 and memory 507) is electrically coupled to and/or in electronic communication with the radar sensor 101. As depicted, the radar sensor 101 may exchange (e.g., transmit and receive) data with the processing circuitry 501 of the controller component 150. For example, the radar sensor 101 may generate sensor data and transmit the sensor data to the processing circuitry 501.

The processing circuitry 501 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 501 may include one or more processors. In one exemplary embodiment, the processing circuitry 501 is configured to execute instructions stored in the memory 507 or otherwise accessible by the processing circuitry 501. When executed by the processing circuitry 501, these instructions may enable the controller component 150 to execute one or a plurality of the functions as described herein. No matter whether it is configured by hardware, firmware/software methods, or a combination thereof, the processing circuitry 501 may include entities capable of executing operations according to the embodiments of the present invention when correspondingly configured. Therefore, for example, when the processing circuitry 501 is implemented as an ASIC, an FPGA, or the like, the processing circuitry 501 may include specially configured hardware for implementing one or a plurality of operations described herein. Alternatively, as another example, when the processing circuitry 501 is implemented as an actuator of instructions (such as those that may be stored in the memory 507), the instructions may specifically configure the processing circuitry 501 to execute one or a plurality of algorithms and operations described herein.

The memory 507 may include, for example, a volatile memory, a non-volatile memory, or a certain combination thereof. Although illustrated as a single memory in FIG. 5, the memory 507 may include a plurality of memory components. In various embodiments, the memory 507 may include, for example, a hard disk drive, a random-access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 507 may be configured to store information, data, application programs, instructions, and etc., so that the controller component 150 can execute various functions according to the embodiments of the present disclosure. For example, in at least some embodiments, the memory 507 is configured to cache input data for processing by the processing circuitry 501. Additionally, or alternatively, in at least some embodiments, the memory 507 is configured to store program instructions for execution by the processing circuitry 501. The memory 507 may store information in the form of static and/or dynamic information. When the functions are executed, the stored information may be stored and/or used by the controller component 150.

The communication module 503 may be implemented as any apparatus included in a circuit, hardware, a computer program product, or a combination thereof, which is configured to receive and/or transmit data from/to another component or apparatus. The computer program product includes computer-readable program instructions stored on a computer-readable medium (for example, the memory 507) and executed by a controller component 150 (for example, the processing circuitry 501). In some embodiments, the communication module 503 (as with other components discussed herein) may be at least partially implemented as the processing circuitry 501 or otherwise controlled by the processing circuitry 501. In this regard, the communication module 503 may communicate with the processing circuitry 501, for example, through a bus. The communication module 503 may include, for example, antennas, transmitters, receivers, transceivers, network interface cards and/or supporting hardware and/or firmware/software, and is used for establishing communication with another apparatus. The communication module 503 may be configured to receive and/or transmit any data that may be stored by the memory 507 by using any protocol that can be used for communication between apparatuses. The communication module 503 may additionally or alternatively communicate with the memory 507, the input/output module 505 and/or any other component of the controller component 150, for example, through a bus.

In some embodiments, the controller component 150 may include an input/output module 505. The input/output module 505 may communicate with the processing circuitry 501 to receive instructions input by the user and/or to provide audible, visual, mechanical, or other outputs to the user. Therefore, the input/output module 505 may include supporting devices, such as a keyboard, a mouse, a display, a touch screen display, and/or other input/output mechanisms. Alternatively, at least some aspects of the input/output module 505 may be implemented on a device used by the user to communicate with the controller component 150. The input/output module 505 may communicate with the memory 507, the communication module 503 and/or any other component, for example, through a bus. One or a plurality of input/output modules and/or other components may be included in the controller component 150.

Figure 6:
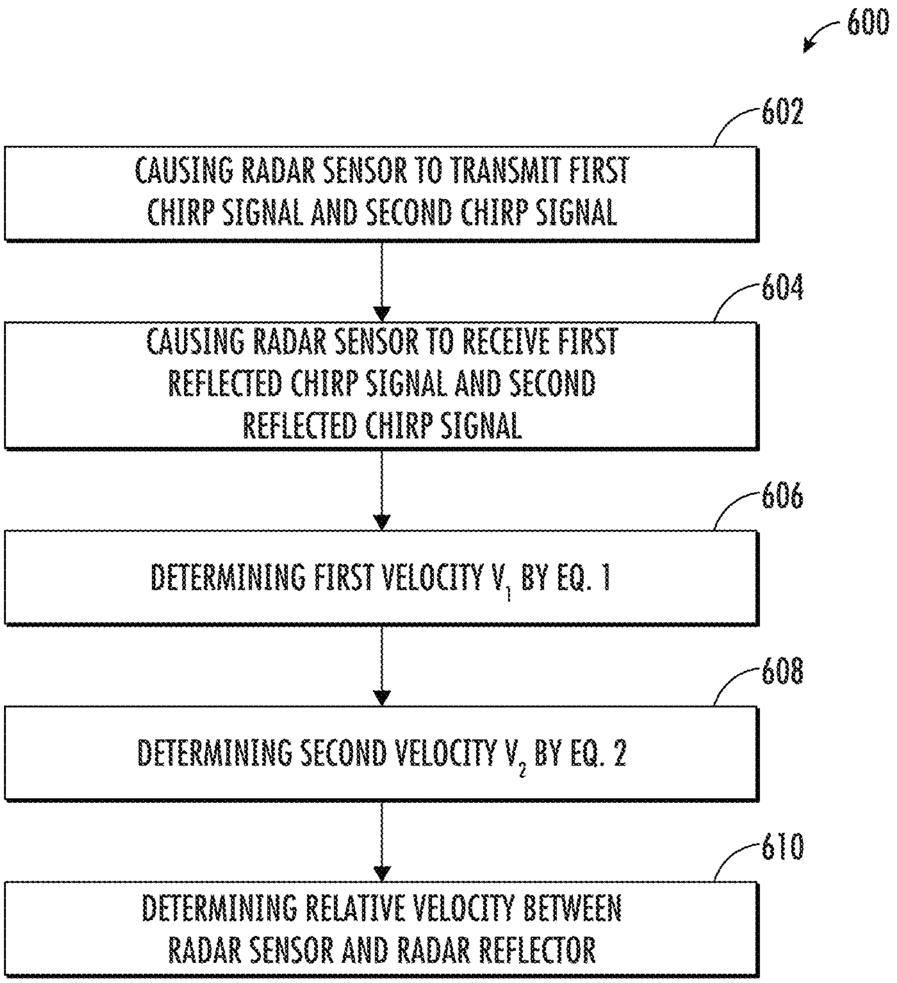
FIG. 6 illustrates an exemplary flow diagram illustrating an exemplary method for measuring a relative velocity between a radar sensor and a radar reflector, in accordance with various embodiments of the present disclosure.

Referring now to FIG. 6, an exemplary flow diagram illustrating an exemplary method for measuring a relative velocity between a radar sensor and a radar reflector by a controller component in accordance with some exemplary embodiments of the present disclosure are provided. It is noted that each block of a flowchart, and combinations of blocks in the flowchart, may be implemented by various means such as hardware, firmware, circuitry and/or other devices associated with execution of software including one or more computer program instructions. For example, one or more of the steps/operations described in FIG. 6 may be embodied by computer program instructions, which may be stored by a non-transitory memory of an apparatus employing an embodiment of the present disclosure and executed by a processor component in an apparatus (such as, but not limited to, a controller component, a programmable processor, a mobile device, a remote computing server, and/or the like). For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 6, an exemplary method 600 for measuring a relative velocity between a radar sensor and a radar reflector in accordance with some exemplary embodiments described herein is illustrated. The exemplary method 600 may be executed by a computing device associated with a controller component (for example, the controller component 150 as illustrated and described above in connection with at least FIG. 1) including processing circuitry and memory (for example, the processing circuitry 501 and the memory 507 as illustrated and described above in connection with at least FIG. 5).

At step/operation 602, the controller component 150 may cause a radar sensor 101 to transmit a first chirp signal 301 and a second chirp signal 302 toward a radar reflector 102.

In some embodiments, for example, the first chirp signal 301 may change a frequency of the first chirp signal 301 linearly with time from a first frequency $f_1$ to a second frequency $f_2$ in a first duration $T_{c1}$. In some embodiments, for example, the second chirp signal 302 may change a frequency of the second chirp signal 302 linearly with time from the first frequency $f_1$ to the second frequency $f_2$ in a first duration $T_{c2}$. In some embodiments, the duration $T_{c1}$ of the first chirp signal 301 may be different from a duration $T_{c2}$ of the second chirp signal 302.

In some embodiments, the radar reflector 102 may reflect the first chirp signal 301 and the second chirp signal 302 back to the radar sensor 101.

At step/operation 604, the controller component 150 may cause the radar sensor 101 to receive reflected signals from the radar reflector 102.

In some embodiments, as shown in FIG. 3, for example, the reflected signals received by the radar sensor 101 may comprise a first reflected chirp signal 303 of the first chirp signal 301 and a second reflected chirp signal 304 of the second chirp signal 302.

At step/operation 606, the controller component 150 may determine a first velocity $V_1$ based on the first chirp signal 301 and the first reflected chirp signal 303 of the first chirp signal 301.

In some embodiments, the controller component 150 may determine a first phase difference $\Delta\varphi_1$ between the first chirp signal 301 and the first reflected chirp signal 303 of the first chirp signal 301 based on the first chirp signal 301 and the first reflected chirp signal 303 of the first chirp signal 301.

In some embodiments, the controller component 150 may determine the first velocity ($V_1$) based on the first phase difference $\Delta\varphi_1$ between the first chirp signal 301 and the first reflected chirp signal 303 of the first chirp signal 301.

In some embodiments, the controller component 150 may determine the first velocity ($V_1$) by Eq. 1.

At step/operation 608, the controller component 150 may determine a second velocity $V_2$ based on the second chirp signal 302 and the second reflected chirp signal 304 of the first chirp signal 301.

In some embodiments, the controller component 150 may determine a second phase difference $\Delta\varphi_2$ between the second chirp signal 302 and the second reflected chirp signal 304 of the second chirp signal 302 based on the second chirp signal 302 and the second reflected chirp signal 304 of the second chirp signal 302.

In some embodiments, the controller component 150 may determine the second velocity ($V_2$) based on the second phase difference $\Delta\varphi_2$ between the second chirp signal 302 and the second reflected chirp signal 304 of the second chirp signal 302.

In some embodiments, the controller component 150 may determine the second velocity ($V_2$) by Eq. 2.

At step/operation 610, the controller component 150 may determine the relative velocity between the radar sensor and the radar reflector 102 based on the first velocity ($V_1$) and the second velocity ($V_2$).

Figure 7:
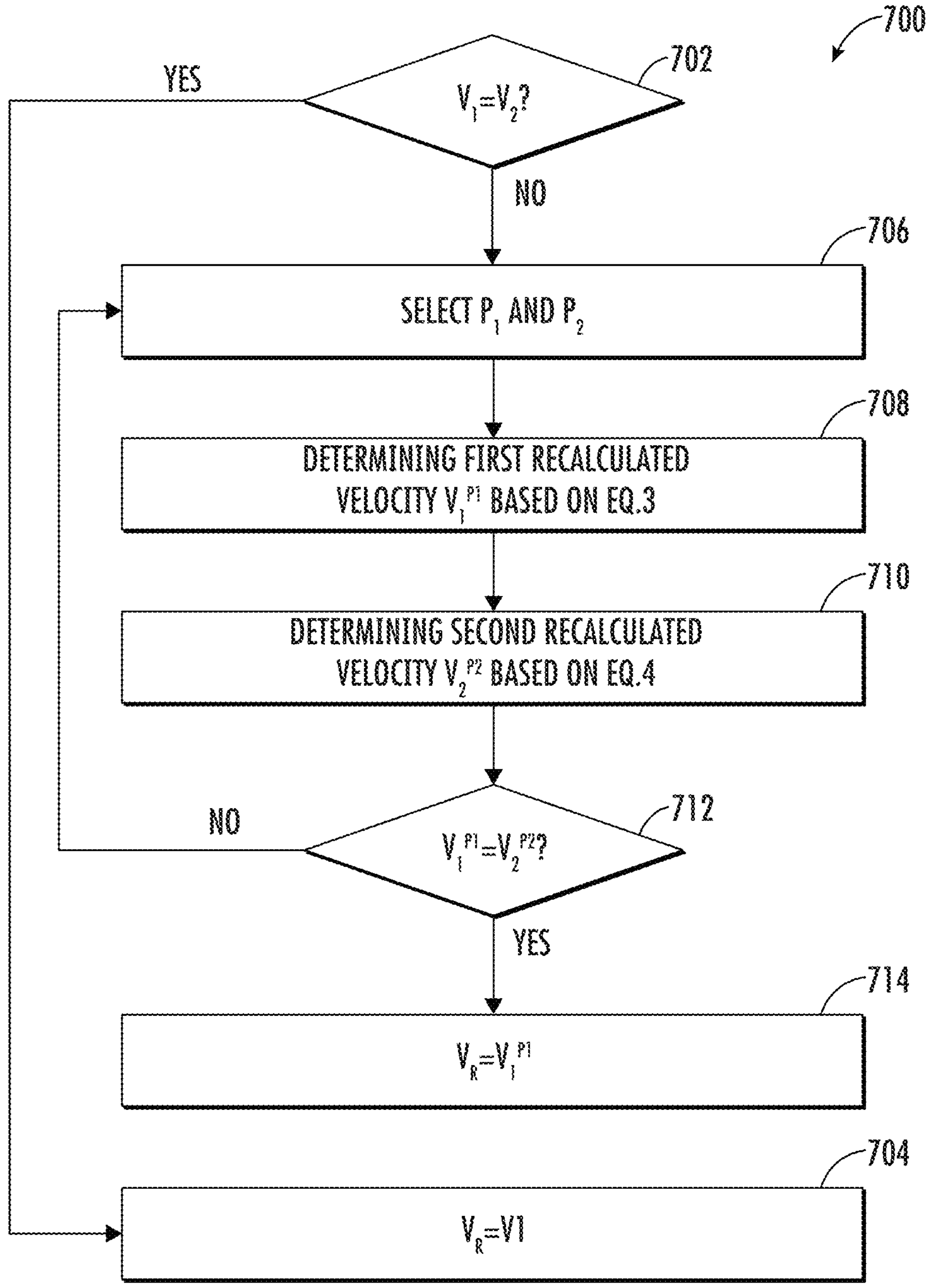
FIG. 7 illustrates an exemplary flow diagram illustrating an exemplary method for measuring a relative velocity between a radar sensor and a radar reflector, in accordance with various embodiments of the present disclosure.

Referring now to FIG. 7, a flowchart diagram illustrating an exemplary method 700 of performing the step/operation 610 to determine the relative velocity between the radar sensor and the radar reflector 102 based on the first velocity ($V_1$) and the second velocity ($V_2$) is provided.

At step/operation 702, the controller component 150 may compare the first velocity ($V_1$) with the second velocity ($V_2$).

In some embodiments, in an instance that the first velocity $V_1$ is substantially equal to the second velocity $V_2$, the exemplary method 700 may proceed to step/operation 704.

At step/operation 704, the controller component 150 may determine that the relative velocity $V_r$ between the radar sensor 101 and the radar reflector 102 is equal to the first velocity $V_1$ or the second velocity $V_2$.

In some embodiments, in an instance that the first velocity $V_1$ is not substantially equal to the second velocity $V_2$, the exemplary method 700 may proceed to step/operation 706.

At step/operation 706, the controller component 150 may select a first integer number $p_1$ and a second integer number $p_2$.

In some embodiments, $p_1$ and $p_2$ may be selected from a preset range. For example, $p_1$ and $p_2$ may be selected from a range from −10 to 10, preferably from a range from −5 to 5, and more preferably from a range from −2 to 2.

At step/operation 708, the controller component 150 may determine a first recalculated velocity $$(V_1^{p1}).$$

In some embodiments, the controller component 150 may determine the first recalculated velocity $$(V_1^{p1})$$

based on the Eq. 3.

At step/operation 710, the controller component 150 may determine a second recalculated velocity $$(V_2^{p2}).$$

In some embodiments, the controller component 150 may determine the second recalculated velocity $$(V_2^{p2})$$

based on the Eq. 4.

At step/operation 712, the controller component 150 may compare the first recalculated velocity $$(V_1^{p1})$$

and the second recalculated velocity $$(V_2^{p2}).$$

In some embodiments, in an instance that the first recalculated velocity $$(V_1^{p1})$$

is substantially equal to the second recalculated velocity $$(V_2^{p2}),$$

the exemplary method 700 may proceed to step/operation 714.

At step/operation 714, the controller component 150 may determine that the relative velocity $V_r$ between the radar sensor 101 and the radar reflector 102 is equal to the first recalculated velocity $$(V_1^{p1})$$

or the second recalculated velocity $$(V_2^{p2}).$$

In some embodiments, in an instance that the first recalculated velocity $$(V_1^{p1})$$

is not substantially equal to the second recalculated velocity $$(V_2^{p2}),$$

the exemplary method 700 may proceed to step/operation 706 to reselect the first integer number $p_1$ and the second integer number $p_2$.

In some embodiments, at step/operation 706, at least one of the first integer number $p_1$ and the second integer number $p_2$ is different from previous selected $p_1$ and $p_2$.

In some embodiments, step/operation 706 may iterate through the preset range to find the first recalculated velocity $$(V_1^{p1})$$

and the second recalculated velocity $$(V_2^{p2})$$

that are substantially equal to each other.

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A method for measuring a relative velocity between a radar sensor and a radar reflector by a controller component, comprising:

causing the radar sensor to transmit a first chirp signal and a second chirp signal toward the radar reflector, wherein a duration of the first chirp signal is different from a duration of the second chirp signal;

causing the radar sensor to receive a first reflected chirp signal of the first chirp signal and a second reflected chirp signal of the second chirp signal;

determining a first velocity based on the first chirp signal and the first reflected chirp signal of the first chirp signal;

determining a second velocity based on the second chirp signal and the second reflected chirp signal of the second chirp signal; and determining the relative velocity between the radar sensor and the radar reflector, wherein determining the relative velocity comprises:

comparing the first velocity and the second velocity, in response to determining that the first velocity is substantially equal to the second velocity, determine the relative velocity as the first velocity, and in response to determining that the first velocity is not substantially equal to the second velocity, repeat determination of the first velocity and the second velocity based on a predetermined integer.

2. The method according to claim 1, wherein determining the first velocity based on the first chirp signal and the first reflected chirp signal of the first chirp signal comprising:

determining a first phase difference between the first chirp signal and the first reflected chirp signal of the first chirp signal; and determining the first velocity based on the first phase difference.

3. The method according to claim 2, wherein the first velocity ($V_1$) is determined by a following equation:

$$V_1 = \frac{\lambda}{4\pi T_{c1}}\Delta\varphi_1 = k_1\Delta\varphi_1 \quad \Delta\varphi_1 \in [-\pi, \pi]$$

wherein $\lambda$ is a wavelength of the first chirp signal, $T_{c1}$ is the duration of the first chirp signal, $\Delta\varphi_1$ is the first phase difference between the first chirp signal and the first reflected chirp signal of the first chirp signal, and $k_1$ is equal to $$\frac{\lambda}{4\pi T_{c1}}.$$

4. The method according to claim 1, wherein determining the second velocity based on the second chirp signal and the second reflected chirp signal of the second chirp signal comprising:

determining a second phase difference between the second chirp signal and the second reflected chirp signal of the second chirp signal; and determining the second velocity based on the second phase difference.

5. The method according to claim 4, wherein the second velocity ($V_2$) is determined by a following equation:

$$V_2 = \frac{\lambda}{4\pi T_{c2}}\Delta\varphi_2 = k_2\Delta\varphi_2\ \Delta\varphi_2 \in [-\pi, \pi]$$

wherein $\lambda$ is a wavelength of the second chirp signal, $T_{c2}$ is the duration of the second chirp signal, $\Delta\varphi_2$ is the second phase difference between the second chirp signal and the second reflected chirp signal of the second chirp signal, and $k_2$ is equal to $$\frac{\lambda}{4\pi T_{c2}}.$$

6. The method according to claim 1, in an instance that the first velocity is not substantially equal to the second velocity, further comprising:

determining a first recalculated velocity ($V_1^{p1}$) based on a following equation:

$$V_1^{p1} = k_1(\Delta\varphi_1 + 2p_1\pi),$$

determining a second recalculated velocity ($V_2^{p2}$) based on a following equation:

$$V_2^{p2} = k_2(\Delta\varphi_2 + 2p_2\pi)$$

wherein $\Delta\varphi_1$ is a first phase difference between the first chirp signal and the first reflected chirp signal of the first chirp signal, and $\Delta\varphi_2$ is a second phase difference between the second chirp signal and the second reflected chirp signal of the second chirp signal, wherein $k_1$ is equal to $$\frac{\lambda}{4\pi T_{c1}},$$

wherein $\lambda$ is a wavelength of the first chirp signal and $T_{c1}$ is the duration of the first chirp signal, wherein $k_2$ is equal to $$\frac{\lambda}{4\pi T_{c2}},$$

wherein $\lambda$ is a wavelength of the second chirp signal and $T_{c2}$ is the duration of the second chirp signal, and wherein $p_1$ and $p_2$ are integer.

7. The method according to claim 6, in an instance that the first recalculated velocity is substantially equal to the second recalculated velocity, the relative velocity between the radar sensor and the radar reflector is equal to the first recalculated velocity.

8. The method according to claim 1, wherein the radar sensor is attached to an object and the radar reflector is stationary, and a velocity of the object is equal to the relative velocity between the radar sensor and the radar reflector.

9. The method according to claim 1, wherein the radar reflector is attached to an object and the radar sensor is stationary, and a velocity of the object is equal to the relative velocity between the radar sensor and the radar reflector.

10. The method according to claim 1, wherein the radar sensor comprises:

at least one transmitter configured to transmit the first chirp signal and the second chirp signal; and at least one receiver configured to receive the first reflected chirp signal of the first chirp signal and the second reflected chirp signal of the second chirp signal.

11. An apparatus for measuring a relative velocity between a radar sensor and a radar reflector, comprising:

the radar sensor;

the radar reflector; and a controller component, wherein the controller component is configured to:

cause the radar sensor to transmit a first chirp signal and a second chirp signal toward the radar reflector, wherein a duration of the first chirp signal is different from a duration of the second chirp signal;

cause the radar sensor to receive a first reflected chirp signal of the first chirp signal and a second reflected chirp signal of the second chirp signal;

determine a first velocity based on the first chirp signal and the first reflected chirp signal of the first chirp signal;

determine a second velocity based on the second chirp signal and the second reflected chirp signal of the second chirp signal; and determine the relative velocity between the radar sensor and the radar reflector, wherein determining the relative velocity comprises:

comparing the first velocity and the second velocity, in response to determining that the first velocity is substantially equal to the second velocity, determine the relative velocity as the first velocity, and in response to determining that the first velocity is not substantially equal to the second velocity, repeat determination of the first velocity and the second velocity based on a predetermined integer.

12. The apparatus according to claim 11, wherein to determine the first velocity based on the first chirp signal and the first reflected chirp signal of the first chirp signal, the controller component is configured to:

determine a first phase difference between the first chirp signal and the first reflected chirp signal of the first chirp signal; and determine the first velocity based on the first phase difference.

13. The apparatus according to claim 12, wherein the first velocity ($V_1$) is determined by a following equation:

$$V_1 = \frac{\lambda}{4\pi T_{c1}}\Delta\varphi_1 = k_1\Delta\varphi_1 \ \Delta\varphi_1 \in [-\pi, \pi]$$

wherein $\lambda$ is a wavelength of the first chirp signal, $T_{c1}$ is the duration of the first chirp signal, $\Delta\varphi_1$ is the first phase difference between the first chirp signal and the first reflected chirp signal of the first chirp signal, and $k_1$ is equal to $$\frac{\lambda}{4\pi T_{c1}}.$$

14. The apparatus according to claim 11, wherein to determine the second velocity based on the second chirp signal and the second reflected chirp signal of the second chirp signal, the controller component is configured to:

determine a second phase difference between the second chirp signal and the second reflected chirp signal of the second chirp signal; and determine the second velocity based on the second phase difference.

15. The apparatus according to claim 14, wherein the second velocity ($V_2$) is determined by a following equation:

$$V_2 = \frac{\lambda}{4\pi T_{c2}}\Delta\varphi_2 = k_2\Delta\varphi_2 \ \Delta\varphi_2 \in [-\pi, \pi]$$

wherein $\lambda$ is a wavelength of the second chirp signal, $T_{c2}$ is the duration of the second chirp signal, $\Delta\varphi_2$ is the second phase difference between the second chirp signal and the second reflected chirp signal of the second chirp signal, and $k_2$ is equal to $$\frac{\lambda}{4\pi T_{c2}}.$$

16. The apparatus according to claim 11, in an instance that the first velocity is not substantially equal to the second velocity, the controller component is configured to:

determine a first recalculated velocity ($V_1^{p1}$) based on a following equation:

$$V_1^{p1} = k_1(\Delta\varphi_1 + 2p_1\pi),$$

and determine a second recalculated velocity ($V_2^{p2}$) based on a following equation:

$$V_2^{p2} = k_2(\Delta\varphi_2 + 2p_2\pi)$$

wherein $\Delta\varphi_1$ is a first phase difference between the first chirp signal and the first reflected chirp signal of the first chirp signal, and $\Delta\varphi_2$ is a second phase difference between the second chirp signal and the second reflected chirp signal of the second chirp signal, wherein $k_1$ is equal to $$\frac{\lambda}{4\pi T_{c1}},$$

wherein $\lambda$ is a wavelength of the first chirp signal and $T_{c1}$ is the duration of the first chirp signal, wherein $k_2$ is equal to $$\frac{\lambda}{4\pi T_{c2}},$$

wherein $\lambda$ is a wavelength of the second chirp signal and $T_{c2}$ is the duration of the second chirp signal, and wherein $p_1$ and $p_2$ are integer.

17. The apparatus according to claim 16, wherein in an instance that the first recalculated velocity is substantially equal to the second recalculated velocity, the relative velocity between the radar sensor and the radar reflector is equal to the first recalculated velocity.

18. The apparatus according to claim 11, wherein the radar sensor is attached to an object and the radar reflector is stationary, and a velocity of the object is equal to the relative velocity between the radar sensor and the radar reflector.

* * * * *